United States Patent
Kodaypak

(10) Patent No.: US 10,212,639 B2
(45) Date of Patent: Feb. 19, 2019

(54) METHOD AND APPARATUS FOR DYNAMIC DATA PATH SELECTION FOR NARROW BAND WIRELESS COMMUNICATION

(71) Applicant: AT&T INTELLECTUAL PROPERTY I, L.P., Atlnata, GA (US)

(72) Inventor: Rajendra Prasad Kodaypak, Sammamish, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 227 days.

(21) Appl. No.: 15/219,649

(22) Filed: Jul. 26, 2016

(65) Prior Publication Data

US 2018/0035351 A1 Feb. 1, 2018

(51) Int. Cl.
*H04W 4/00* (2018.01)
*H04W 40/02* (2009.01)
(Continued)

(52) U.S. Cl.
CPC ............ *H04W 40/02* (2013.01); *H04L 1/22* (2013.01); *H04W 12/06* (2013.01); *H04W 76/10* (2018.02);
(Continued)

(58) Field of Classification Search
CPC .... H04W 40/02; H04W 76/10; H04L 61/1511
See application file for complete search history.

(56) References Cited

U.S. PATENT DOCUMENTS

| | | | |
|---|---|---|---|
| 8,103,287 B2 | 1/2012 | Mueck et al. | |
| 8,548,492 B2 | 10/2013 | Islam et al. | |

(Continued)

FOREIGN PATENT DOCUMENTS

| | | |
|---|---|---|
| CN | 102148736 A | 8/2011 |
| CN | 102164271 A | 8/2011 |

(Continued)

OTHER PUBLICATIONS

Fujdiak, Radek, "In-Depth Analysis of Smart City in Modern Age", http://www.academia.edu/download/45272152/EEICT2016.pdf, Disclosing locating new equipment and determining location of existing devices (p. 574 for location in the group of characteristics)., 2016.

(Continued)

*Primary Examiner* — Chi H Pham
*Assistant Examiner* — Fahmida S Chowdhury
(74) *Attorney, Agent, or Firm* — Guntin & Gust, PLC; Douglas Schnabel

(57) ABSTRACT

Aspects of the subject disclosure may include, for example, querying a domain name server for status information associated with a set of service capability exposure function (SCEF) nodes associated with providing data capability for a wireless communication device in a mobile communication network, receiving, from the domain name server, status information associated with a set of SCEF nodes that are selected, selecting a first SCEF node from the set of SCEF nodes according to the status information for the set of SCEF nodes, initiating a first non-IP packet data network connection with the first SCEF node, initiating a user plane packet data network connection with a serving gateway node of the mobile communication network, wherein the serving gateway node includes a serving gateway and a packet data network gateway, and selecting the first non-IP packet data network connection or the user plane packet data network connection as a delivery path.

20 Claims, 9 Drawing Sheets

(51) Int. Cl.
*H04L 1/22* (2006.01)
*H04W 12/06* (2009.01)
*H04W 76/10* (2018.01)
*H04W 76/12* (2018.01)
*H04W 8/08* (2009.01)
*H04L 29/12* (2006.01)
*H04W 8/04* (2009.01)
*H04W 88/16* (2009.01)

(52) U.S. Cl.
CPC ......... *H04W 76/12* (2018.02); *H04L 61/1511* (2013.01); *H04W 8/04* (2013.01); *H04W 8/08* (2013.01); *H04W 88/16* (2013.01)

(56) References Cited

U.S. PATENT DOCUMENTS

| | | | |
|---|---|---|---|
| 8,787,942 | B2 | 7/2014 | Hannan et al. |
| 8,838,806 | B2 | 9/2014 | Lu et al. |
| 8,908,562 | B2 | 12/2014 | Jin et al. |
| 8,934,909 | B2 | 1/2015 | Koskela et al. |
| 9,002,393 | B2 | 4/2015 | Seed et al. |
| 9,071,620 | B2 * | 6/2015 | Della-Torre ........ H04L 65/1036 |
| 9,094,816 | B2 | 7/2015 | Maier et al. |
| 9,137,647 | B2 | 11/2015 | Mahajan |
| 9,179,409 | B2 | 11/2015 | Gupta et al. |
| 9,232,498 | B2 | 1/2016 | Mohanty et al. |
| 9,232,524 | B2 | 1/2016 | Tian et al. |
| 9,247,554 | B2 | 1/2016 | Van et al. |
| 9,288,114 | B2 | 3/2016 | Zhang et al. |
| 9,307,344 | B2 | 4/2016 | Rucker et al. |
| 9,326,173 | B2 | 4/2016 | Luft |
| 9,363,819 | B2 | 6/2016 | Wang et al. |
| 2010/0029211 | A1 | 2/2010 | Teague et al. |
| 2010/0246536 | A1* | 9/2010 | Della-Torre ........ H04L 65/1069 370/335 |
| 2011/0200052 | A1 | 8/2011 | Mungo et al. |
| 2012/0082091 | A1 | 4/2012 | Siomina et al. |
| 2012/0084449 | A1* | 4/2012 | Delos Reyes ....... H04L 61/1511 709/229 |
| 2012/0088521 | A1 | 4/2012 | Nishida et al. |
| 2012/0203905 | A1 | 8/2012 | Lee et al. |
| 2012/0302261 | A1 | 11/2012 | Tinnakornsrisuphap et al. |
| 2013/0190006 | A1 | 7/2013 | Kazmi et al. |
| 2013/0265984 | A1 | 10/2013 | Li et al. |
| 2014/0244834 | A1 | 8/2014 | Guedalia et al. |
| 2015/0045057 | A1 | 2/2015 | Tee et al. |
| 2015/0134761 | A1 | 5/2015 | Sharma et al. |
| 2015/0195670 | A1 | 7/2015 | Agee |
| 2015/0199610 | A1 | 7/2015 | Hershberg |
| 2015/0264512 | A1* | 9/2015 | Jain ....................... H04W 4/70 370/328 |
| 2015/0312822 | A1* | 10/2015 | Bangolae .............. H04W 36/08 370/311 |
| 2015/0334545 | A1 | 11/2015 | Maier et al. |
| 2015/0358777 | A1* | 12/2015 | Gupta ................. H04L 12/2807 370/254 |
| 2016/0007138 | A1 | 1/2016 | Palanisamy et al. |
| 2016/0007316 | A1 | 1/2016 | Vaidya et al. |
| 2016/0044651 | A1 | 2/2016 | Lu |
| 2016/0100362 | A1 | 4/2016 | Palanisamy et al. |
| 2016/0105891 | A1 | 4/2016 | Li et al. |
| 2016/0135143 | A1 | 5/2016 | Won et al. |
| 2016/0164831 | A1 | 6/2016 | Kim |
| 2017/0135031 | A1* | 5/2017 | Buckley ............... H04B 1/3816 |
| 2017/0295557 | A1* | 10/2017 | Chamarty ......... H04W 52/0225 |
| 2018/0109941 | A1* | 4/2018 | Jain ....................... H04W 60/00 |

FOREIGN PATENT DOCUMENTS

| | | |
|---|---|---|
| CN | 102170561 A | 8/2011 |
| CN | 103532798 A | 1/2014 |
| CN | 103634734 A | 3/2014 |
| CN | 103843261 A | 6/2014 |
| EP | 2869644 A1 | 5/2015 |
| EP | 3018946 | 5/2016 |
| GB | 2510141 A | 7/2014 |
| WO | 2015153589 | 10/2015 |
| WO | 2015191835 | 12/2015 |
| WO | 2015200801 | 12/2015 |
| WO | 2016036469 | 3/2016 |
| WO | 2016045602 | 3/2016 |
| WO | 2016073533 | 5/2016 |

OTHER PUBLICATIONS

Husain, Syed, "Recent Trends in IoT/M2M related Standards", https://www.researchgate.net/profile/Athul_Prasad/publication/271763342_Recent_Trends_in_Standards_Related_to_the_Internet_of_Things_and_Machine-to-Machine_Communications/links/5523806d0cf2f9c1305469d4.pdf, 2014.

Kassem, Mohamed, "Future Wireless Spectrum Below 6 GHz: A UK Perspective", http://homepages.inf.ed.ac.uk/mmarina/papers/dyspan15.pdf, Discloses estimating device locations for an IoT/M2M database (Figure 4 and in Section B on the 8th thru 11th Pages)., 2015.

Kunz, Andreas, "Enhanced 3GPP system for Machine Type Communications and Internet of Things", https://www.researchgate.net/profile/Athul_Prasad/publication/281857143_Enhanced_3GPP_system_for_Machine_Type_Communications_and_Internet_of_Things/links/55fbcbed08ae07629e07c2aa.pdf, 2015.

Salman, Tara, "Networking Protocols and Standards for Internet of Things", http://www.cse.wustl.edu/~jain/cse570-15/ftp/iot_prot.pdf, Discloses recognizing the need for IoT devices to move freely and change configuration bades on location (pp. 8, 10 and 21)., 2015.

Samdanis, Konstantinos, "From Network Sharing to Multi-tenancy: The 5G Network Slice Broker", http://arxiv.org/pdf/1605.01201, Disclosing that the 3GPP Service Capability Exposure Function (SCEF)in the operator trust domain securely exposes selected service capabilities (Section 4, p. 6 and Figure 4)., 2016.

Shin, Jung Wan et al., "Control Channel Load Balancing in Narrow Band Cellular IoT Systems Supporting Coverage Class", http://uksim.info/isms2016/CD/data/0665a343.pdf, Disclosing dynamically reconfiguring channels when narrow-band devices are moved into a new location (p. 346)., 2016.

Song, Jaeseung, "Connecting and Managing M2M Devices in the Future Internet", https://www.researchgate.net/profile/Mischa_Schmidt/publication/262290895_Connecting_and_Managing_M2M_Devices_in_the_Future_Internet/links/55ba132b08aed621de0a9f4c.pdf, Disclosing a server mapping machine-type communications(MTC) (p. 3; Figure 2)., 2014.

Wang, Qing et al., "Dynamic Spectrum Allocation under Cognitive Cell Network for M2M Applications", http://researcher.watson.ibm.com/files/us-the/WangEtal12Asilomar.final.pdf, Discloses obtaining locations for synchronizing cell and mitigating interference (p. 3, Section II-B)., 2012.

Xiong, Xiong, "Low Power Wide Area Machine-To-Machine Networks: Key Techniques and Prototype", https://www.researchgate.net/profile/Periklis_Chatzimisios/publication/281896505_Low_power_wide_area_machine-to-machine_networks_key_techniques_and_prototype/links/563a12c608ae ed0531dc9e72.pdf, Discloses locating newly-placed, mobile & battery-powered equipment (pp. 68-70, ultra narrow-band on p. 64)., 2015.

Yang, Wenjie Kristo et al., "Power- and Spectrally-Efficient Network Access for Cellular Machine-Type Communications", http://arxiv.org/pdf/1512.05500, Discloses resolving ambiguities resulting from lack of device identifier in the LTE random access preamble with a special mapping signal (p. 9, Section B)., 2015.

* cited by examiner

400

600

800

METHOD AND APPARATUS FOR DYNAMIC DATA PATH SELECTION FOR NARROW BAND WIRELESS COMMUNICATION

FIELD OF THE DISCLOSURE

The subject disclosure relates to a method and apparatus for dynamic data path selection for a narrow band wireless communication.

BACKGROUND

Modern telecommunications systems provide consumers with telephony capabilities while accessing a large variety of content. Consumers are no longer bound to specific locations when communicating with others or when enjoying multimedia content or accessing the varied resources available via the Internet. Network capabilities have expanded and have created additional interconnections and new opportunities for using mobile communication devices in a variety of situations. Intelligent devices offer new means for experiencing network interactions in ways that anticipate consumer desires and provide solutions to problems.

BRIEF DESCRIPTION OF THE DRAWINGS

Reference will now be made to the accompanying drawings, which are not necessarily drawn to scale, and wherein.

DETAILED DESCRIPTION

Figure 1:
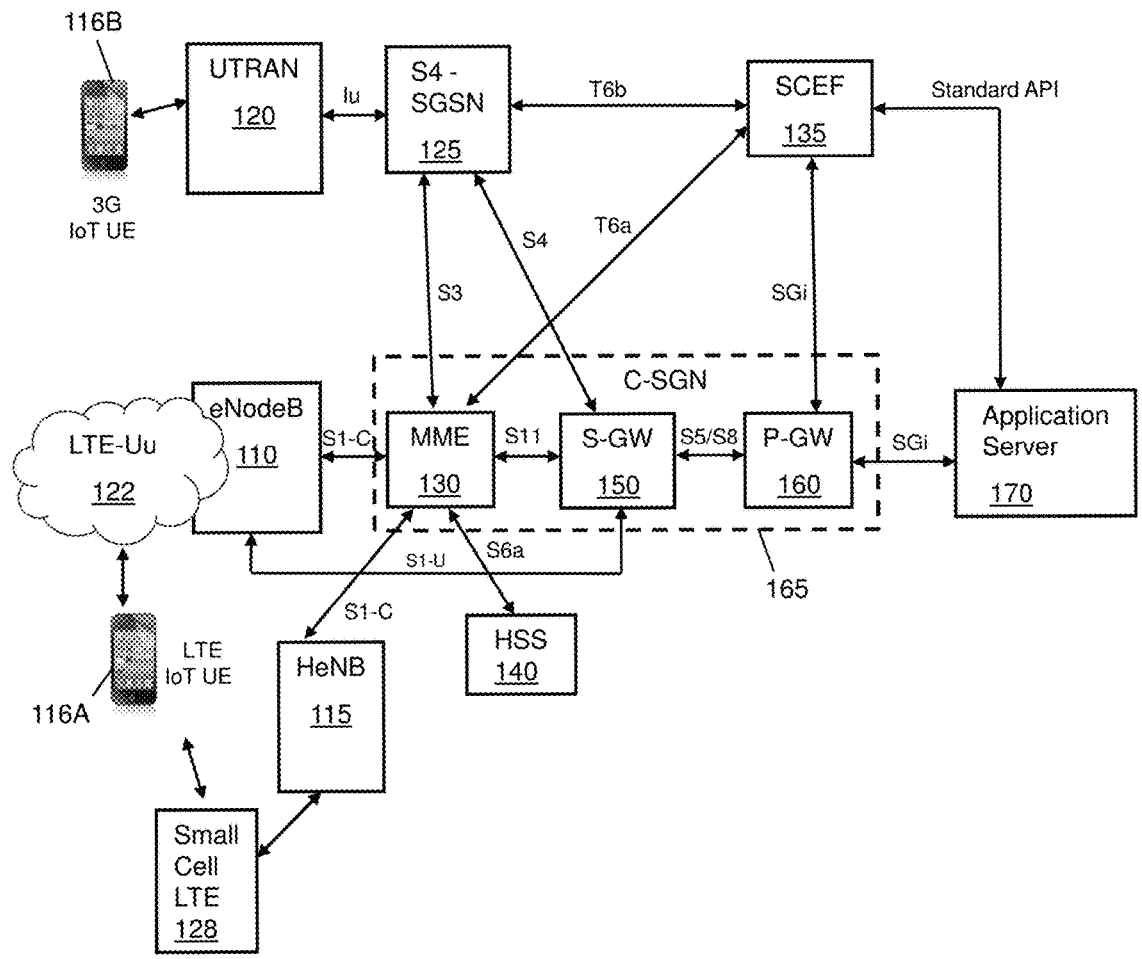
FIG. 1 depicts illustrative embodiments of a system for providing communication services for narrow band wireless devices in a mobile communication network.

The subject disclosure describes, among other things, illustrative embodiments for a method and an apparatus for dynamically connecting a narrow band wireless communication device to one or more data paths. In one or more embodiments, wireless communication devices, such as a Narrow Band Internet of Things (NB-IoT) devices, can wirelessly connect to a mobile communication network to engage in intermitted data transfers with application services that are connected to the back end of the mobile communication network. The network can be optimized to provide high quality service to the NB-IoT devices, while maintaining high quality service for traditional, mobile communication devices, by selectively and dynamically allocating various parts of the infrastructure of the network to servicing these devices. A Mobility Management Entity (MME) server of the network can detect a request from a Radio Access Network (RAN) to attach, or connect, a NB-IoT device to the network and can access a Home Subscriber Server (HSS) to authenticate the NB-IoT device to the network. The MME server can further use subscription data for the NB-IoT device to analyze characteristics of the NB-IoT device that enable the MME server to identify the NB-IoT device as a narrow band device, to determine if the NB-IoT device is stationary or roaming with respect to the RAN, and/or to determine which network resources are local to the NB-IoT device.

In one or more embodiments, the MME server select one or more Service Capability Exposure Function (SCEF) nodes and/or Interworking SCEF (IWK SCEF) nodes as candidates for service the NB-IoT device based on whether the NB-IoT device is stationary or roaming device with respect to the operator's serving RAN and/or PLMN. The MME server can query a Domain Name Server (DNS) for status information regarding the SCEF and/or IWK SCEF nodes and, in turn, select a specific SCEF/IWK SCEF node (or nodes) for providing data path connectivity for the NB-IoT device in the network. The MME server can then initiate a non-Internet Protocol (non-IP) packet data network (PDN) connection between the NB-IoT device and the selected SCEF/IWK SCEF to provide a first data transfer path between the NB-IoT device and an Application Server (AS) that is connected to the back end of the network via the selected SCEF/IWK SCEF node. The MME server can also initiate a user plane PDN connection between the NB-IoT device and a selected cellular IoT Serving Gateway Node (CSGN), including a Serving Gateway (SGW) and a PDN-Gateway (PGW). The user plane PDN connection can provide a second data transfer path between the NB-IoT device and the AS. The MME server can then dynamically select between the first and second data paths based on data volume and can dynamically change the selections of the specific SCEF/IWK SCEF node and/or the specific CSGN based on changing operating conditions. Other embodiments are described in the subject disclosure.

One or more aspects of the subject disclosure include a mobility management entity server, including a processing system including a processor and a memory that stores executable instructions that, when executed by the processing system, facilitate performance of operations, including receiving, from a radio access network, a request to connect a wireless communication device to a mobile communication network. The operations can include determining, from subscription data associated with the wireless communication device, whether the wireless communication device is operating in a stationary mode or a roaming mode with respect to a serving area of the radio access network. The operations can also include selecting a set of service capability exposure function nodes of the mobile communication network that are local to the serving area if the wireless communication device is determined to be operating in the stationary mode and that are remote to the serving area if the wireless communication device is determined to be operating in the roaming mode. The operations can further include receiving, from a domain name server, status information associated with the set of service capability exposure function nodes that are selected. The operations can include selecting a first service capability exposure function node from the set of service capability exposure function nodes according to the status information for the set of service capability exposure function nodes. The operations can also include initiating a first non-IP packet data network connection with the first service capability exposure function node, and, in turn, initiating a user plane packet data network connection with a serving gateway node of the mobile communication network, wherein the serving gateway node includes a serving gateway and a packet data network gateway. The operations can also include selecting the first non-IP packet data network connection or the user plane packet data network connection as a delivery path for data to transfer between the wireless communication device and an external application server according to a data volume associated with a request for the transfer.

One or more aspects of the subject disclosure include a machine-readable storage medium, comprising executable instructions that, when executed by a processing system including a processor, facilitate performance of operations at a call session control function server, including receiving, from a radio access network, a request to connect a wireless communication device to a mobile communication network, and, in turn, authenticating the wireless communication device from subscription data associated with the wireless communication device. The operations can include querying a domain name server for status information associated with a set of service capability exposure function nodes associated with providing data capability for the wireless communication device, and, in turn, receiving, from a domain name server, status information associated with a set of service capability exposure function nodes that are selected. The operations can further include selecting a first service capability exposure function node from the set of service capability exposure function nodes according to the status information for the set of service capability exposure function nodes. The operations can also include initiating a first non-IP packet data network connection with the first service capability exposure function node, and, in turn, initiating a user plane packet data network connection with a serving gateway node of the mobile communication network. The serving gateway node can include a serving gateway and a packet data network gateway. The operations can further include selecting the first non-IP packet data network connection or the user plane packet data network connection as a delivery path for data to transfer between the wireless communication device and an external application server according to a data volume associated with a request for the transfer.

One or more aspects of the subject disclosure include a method, including querying, by a processing system including a processor, a domain name server for status information associated with a set of service capability exposure function nodes associated with providing data capability for a wireless communication device in a mobile communication network. The method can also include receiving, from the domain name server, by the processing system, status information associated with a set of service capability exposure function nodes that are selected, and, in turn, selecting, by the processing system, a first service capability exposure function node from the set of service capability exposure function nodes according to the status information for the set of service capability exposure function nodes. The method can further include initiating, by the processing system, a first non-IP packet data network connection with the first service capability exposure function node. The method can include initiating, by the processing system, a user plane packet data network connection with a serving gateway node of the mobile communication network, wherein the serving gateway node includes a serving gateway and a packet data network gateway. The method can also include selecting, by the processing system, the first non-IP packet data network connection or the user plane packet data network connection as a delivery path for data to transfer between the wireless communication device and an external application server according to a data volume associated with a request for the transfer.

Figure 2:
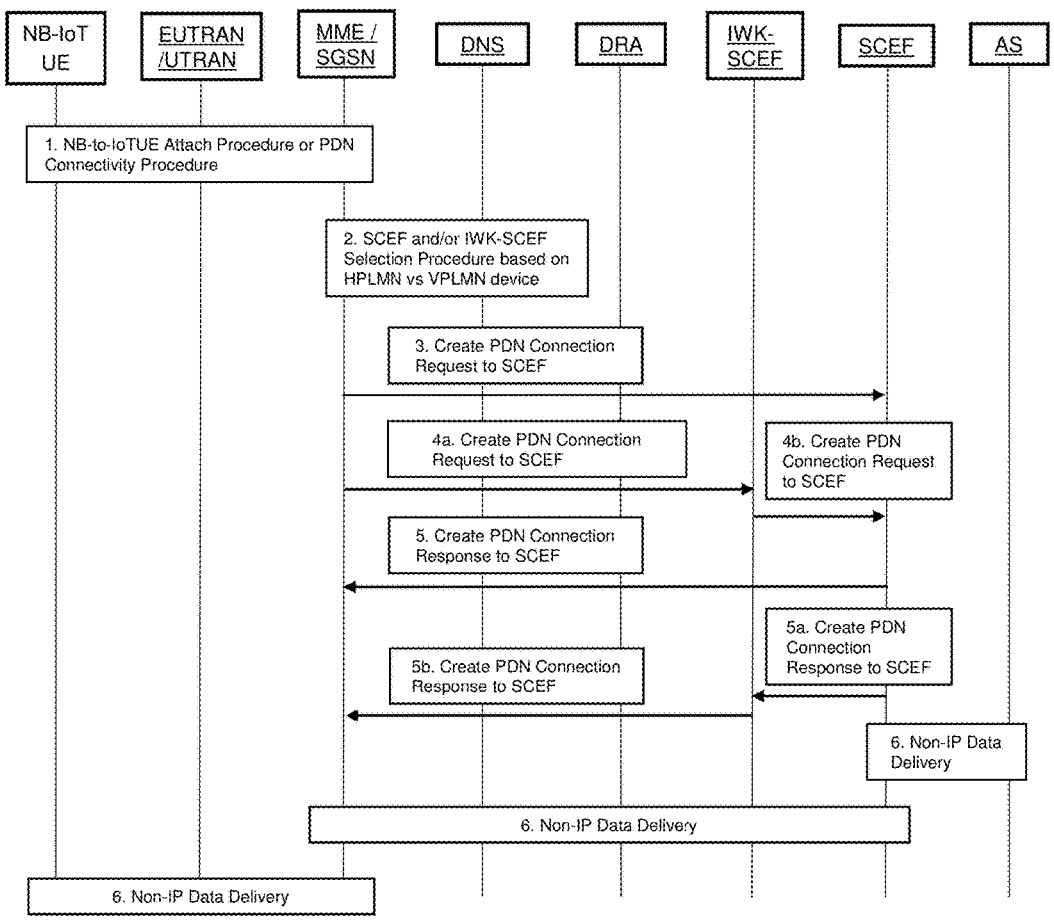
FIG. 2 depicts illustrative embodiments of a data flow diagram for dynamically selecting and changing data paths for narrow band wireless devices in a mobile communication network.

In FIG. 1, a mobile communication system 100 is illustrated that can provide wireless communication services, including voice, video and/or data services to wireless communication devices 116A-B. In FIG. 2, illustrative embodiments are depicted for a data flow diagram for dynamically selecting and changing data paths for narrow band wireless devices in a mobile communication network. The system 100 is a simplified version of a Narrow Band Internet of Things (NB-IoT) network. System 100 can enable wireless communication services over a number of different networks, such as between wireless communication devices 116A-B and/or other communication devices and/or one or more application servers 170. The wireless communication devices 116A-B can be capable of voice, video and/or data communications, including cellular phones, smartphones, personal computers, media processing devices, and so forth. The wireless communication devices 116A-B can be fixed location machines with wireless communication capabilities, such as vending machines, utility meters, and monitoring devices that can advantageously communicate through the wireless capabilities of the system 100. The wireless communication devices 116A-B can be Narrow Band Internet of Things (NB-IoT) devices, which can exhibit characteristics of intermittent data transfer activity and the use of a narrow bandwidth of the available wireless data channel. The wireless communication devices 116A-B can be movable from location to location, while remaining wirelessly connected to the system 100 via various wireless communication assets of the system 100. The wireless communication devices 116A-B can, alternatively, remain in fixed locations with respect to the wireless communication assets of the system 100 so that, effectively, the wireless communication devices 116A-B can rely on specific wireless communication assets of the system 100.

In one or more embodiments, in addition to the wireless communication devices 116A-B, the system 100 can include one or more Radio Access Networks (RAN) or Radio Access Technologies (RAT). In one embodiment, the system 100 can include a Universal Terrestrial Radio Access Network (UTRAN) 120 capable of supporting a wireless interface to a wireless communication device 116B in a Third Generation Wireless Mobile Communication Technology (3G) system. In this example, the wireless communication device 116B can support 3G IoT user equipment (3G IoT UE). In one embodiment, the system 100 can include a Long-Term Evolution (LTE) Radio Access Technology (RAT) network, or an LTE-Uu network 122, such as an Evolved UMTS Terrestrial Radio Access Network (E-UTRAN), a Universal Mobile Telecommunications System (UMTS), a Global System for Communications (GSM) network, an Evolution Data Only (EVDO) network, or a Code Division Multiple Access (CDMA) network. A LTE-Uu network can provide radio communication assets for wireless connectivity between a wireless communication device 116A and a Mobile Packet Core (MPC) of the system 100. The LTE-Uu network 122 can utilize a number of interfaces, including Iu, Uu, Iub and/or Iur.

In one or more embodiments, the system 100 can include a Serving GPRS Support Node (SGSN) 125 that can handle all of the PDN traffic for the 3G IoT device 116B. The system can also include a Service Capability Exposure Function (SCEF) 135 for providing a non-IP PDN data path for the wireless communication device 116A-B to an Application Server (AS) 170. In one or more embodiments, the MME 130, S-GW 150, and P-GW 160 can form a Cellular IoT Serving Gateway Node (C-SGN) 165 that can provide an IP, user plane PDN path to the AS 170. In one or more embodiments, the system 100 can include a Home eNodeB node (HeNB) 115, which can perform a similar function to the eNodeB node 110, but can be optimized for a Small Cell LTE 128, such as relatively low-powered RAN that can operate in a building.

In one or more embodiments, the network 100 can be a cellular IoT core network 100 that can facilitate connection of a wireless communication device 116A to a cellular IoT serving gateway node (C-SGN) 165. In this simplified system 100, the wireless communication device 116A can be a Narrow Band Internet of Things (NB-IoT) device 116A. The C-SGN 165 can be a collapsed version of an evolved packet core network and can include an MME 130, a S-GW 150, and a P-GW 160.

In one or more embodiments, a NB-IoT device 116A can be coupled to an eNodeB 110, via an LTE-Uu network 122. The NB-IoT device 116A can carry many traffic types, including IP-based packet data network (PDN) traffic and non-IP PDN traffic. In one or more embodiments. An E-UTRAN-based LTE-Uu network 122 can include one or more eNodeB nodes 110 on the network that can be connected to each other via X2 interfaces and which can be further connectable to the network 100 via an S1-C interface. For example, an E-UTRAN-based LTE-Uu 122 can use various communication techniques including orthogonal frequency-division multiplexing (OFDM), multiple-input multiple-output (MIMO) antenna technology depending on the capabilities of the terminal, and beam forming for downlink to support more users, higher data rates and lower processing power required on each handset.

In one or more embodiments, an eNodeB 110 can include an air interface to an LTE-Uu network 122 and can include network interfaces S1-C to a Mobility Management Entity (MME) 130. The air interface can support an E-UTRAN-based LTE-Uu network 122, which can further support downlink and uplink protocols, including Orthogonal Frequency-Division Multiple Access (OFDMA) protocol and/or Single-Carrier Frequency-Division Multiple Access (SC-FDMA) protocol. The LTE-Uu interface 122 can enable the eNodeB 110 to receive requests for connection to the system 100 from various types of wireless communication devices 116A, including smart phone devices and NB IoT devices.

In one or more embodiments, the eNodeB 110 can perform operations consistent with the 3GPP standard. In one or more embodiments, the eNodeB 110 can request attachment of the NB-IoT device 116A to the network 100. In one embodiment, the eNodeB 110 can forward a connection request from the wireless communication device 116A to the MME 130. An authentication request for the NB-IoT device 116A can be flow to the MME 130, for example, via a Non-Access Stratum (NAS) protocol message. The NAS protocol authentication request can flow directly from the wireless communication device 116A to the MME 130, via a—is this S1AP protocol over the SCTP transport on the S1-MME link between eNodeB 110 and the MME 130. At the MME 130, the authentication request can be converted to an Internet Engineering Task Force (IETF) standard authentication message protocol, such as the—is this DIAMETER? protocol. The converted, authentication message in the _is this DIAMETER? protocol can be forwarded to a Home Subscription Service (HSS) server 115 for verification of the authentication request for the NB-IoT device 116A. In one embodiment, when the NB-IoT device 116A is booted up, it can send an attach request or an authentication request to the MME 130 via eNodeB 110.

In one or more embodiments, the Home Subscriber Server (HSS) 115 can provide a central database that contains user-related and subscription-related information. The functions of the HSS 115 can include mobility management, call and session establishment support, user authentication and access authorization. In one embodiment, the HSS 115 can manage subscription-related information in real time, for multi-access and multi-domain offerings in an all-IP environment. The HSS 115 can be based on Home Location Register (HLR) and Authentication Center (AuC).

Upon powering up, the NB-IoT device 116A can connect to a RAN, which can include the LTE-Uu 122 and the eNodeB node 110. Further, the NB-IoT device 116A can seek to connect to the system 100 via a serving MME 130 that is within a given geographic coverage area, typically of a local RAN 122 and 110. In one or more embodiments, if a NB-IoT device 116A does not have any type of activity over a certain time period, then the device 116A can enter into an IDLE mode in order to preserve its battery life. In one embodiment, the NB-IoT device 116A, the network RAN 122 and 110, and the MME 130 can support an extended IDLE mode DRX capability that can save radio transmission power, as well as further extend the battery life of the device 116A. An internal or external trigger can cause the NB-IoT device 116A to transmit data. In this case, the NB-IoT device 116A may need to establish a data connection to be able to engage in data transfer with the network 100 and/or a target application service (AS) 170 and/or a target application provider.

In one or more embodiments, during an connect attempt and/or during a PDN connectivity procedure for an NB-IoT device 116A, the serving MME 130 can request an authentication of the NB-IoT device 116A. The MME 130 can initiate the authentication with the assistance of the HSS 140 of the system 100. Upon successfully authenticating of the NB-IoT device 116A, the MME server 130 can select a service capability exposure function (SCEF) 135 that can act as a gateway towards the external application server (AS) provider 170 for non-IP PDN communications with the AS 170. The MME server 130 can select a SCEF entity 135 based on a set of system attributes which can be obtained from a Domain Naming Server. The MME can then initiate a data connection with the selected SCEF 135. In one or more embodiments, the MME server 130 could use an intelligent Public Land Mobile Network (PLMN) and/or an International Mobile Subscriber Identity (IMSI) range for the NB-IoT device 116A to determine series provisioning for the selection of the SCEF 135. The MME server 130 can determine whether the NB-IoT device 116A is a stationary user or a roaming user and can use internal logic in the MME server 130 to route a stationary, or home, NB-IoT device 116A and/or roaming NB-IoT device 116A towards a selected SCEF 135. The MME 130 can communicate with the SCEF server 135 over a T6a Diameter link based on a signaling interface. The T6a Diameter link can use a Stream Control Transmission Protocol (SCTP) transport protocol. In one embodiment, a multi-homed SCTP association can be established between the MME server 130 and the SCEF 135 prior to establishing a Diameter connection. Where the NB-IoT device 116A is determined to be a roaming NB-IoT device 116A, the MME server 130 can route the data connection towards an interworking SCEF (IWK-SCEF). The IWK-SCEF can be located in a PLMN that is visited by the NB-IoT device 116A, and this routing can be established via a T6ai interface. The IWK-SCEF 135 can communicate to its home SCEF 135 via a T7 interface. The IWK-SCEF 135 could be an independent network entity or an integrated application software entity within the SCEF 135.

In one or more embodiments, the IoT core network 100 can include an accurate mapping of a complete list of downstream/upstream network entities between MME server 130 (in the C-SGN 165) and the SCEF 135 (or IWK SCEF) in the IoT core network 100. This mapping can be based on the operator's LTE network topology design. For a centralized network topology, there could be a single SCEF geo-redundant pair deployed, that can require a downstream MME server 130 provisioning of control, as well as provisioning of upstream application service (AS) providers 170 that are allowed to securely interwork with this entity. For a distributed SCEF topology design, the provisioning of upstream and downstream control nodes has to be replicated accordingly across each paired SCEF element.

In one or more embodiments, where the HSS 115 returns a successful authentication of the NB-IoT device 116A, the MME 130 can also perform control plane functions for enabling IP PDN communications with the AS 170. In one embodiment, the MME 130 can assign one or more bearer gateways 150 and 160 for use in transporting user data to and from the wireless communication device 116A. For example, the MME 130 can assign one or more default bearer gateways 150 and 160 and/or one or more dedicated bearer gateways 150 and 160.

In one or more embodiments consistent with the 3GPP standard, after the MME 130 has performed assignment of bearer gateways 150 and 160 for the wireless communication device 116A, the MME 130 can further perform updates and handovers on behalf of the wireless communication device 116A as the wireless communication device 116A moves between various LTE-Uu wireless network 122 locations. The MME 130 can assign initial bearer gateways 150 and 160 for the wireless communication device 116A based on location information associated with the NB-IoT device 116A. However, if the NB-IoT device 116A moves to a different location, then the MME 130 can be required to update the assignment of the bearer gateways 150 and 160 to fulfill performance requirements. Hence, the MME 130 can assign and maintain bearer pathways for user data for the NB-IoT device 116A. In one or more embodiments, the eNodeB 110 supports a tunneling protocol pathway for authentication, control plane, and user plane for the wireless communication device 116A.

In one or more embodiments, the MME 130 can also perform functions such as idle mode tracking and paging procedure including retransmissions. The MME 130 can choose a S-GW 150 for the NB-IoT device 116A. The S-GW 150 can route and forward user data packets, while also acting as the mobility anchor for the user plane during inter-eNodeB handovers and as the anchor for mobility between LTE and other 3GPP technologies. For a NB-IoT device 116A in idle state, the S-GW 150 can terminate a downlink data path and can trigger paging when downlink data arrives for the NB-IoT device 116A. The S-GW 150 can manage and can store contexts, such as parameters of an IP bearer service and/or network internal routing information.

In one or more embodiments, the PDN Gateway (P-GW) 160 can provide connectivity from the NB-IoT device 116A to external packet data networks, including the AS 170, by being the point of exit and entry of traffic for the NB-IoT device 116A. The NB-IoT device 116A can have simultaneous connectivity with more than one P-GW 160 for accessing multiple PDNs. The P-GW 160 can perform policy enforcement, packet filtering for each user, charging support, lawful interception and/or packet screening. The P-GW 160 can also act as the anchor for mobility between 3GPP and non-3GPP technologies such as WiMAX and 3GPP2 (CDMA 1× and EvDO).

In a conventional and simplistic NB-IoT LTE core network 100, the MME server 130 can be connected to the SCEF 135 in a 1:1 peered mode. The SCEF 135 could also be connected to the external IoT application server (AS) 170 in a 1:1 peered mode. These connections can enable data transfers associated with a given AS 170. In this simplified arrangement, the NB-IoT device 116A can be connected to the LTE high-speed mobility network to gain services from their target AS 170 in the Home PLMN (HPLMN) network 100. The NB-IoT device 116A and eNodeB 110 can initiate an attach request procedure and/or PDN connectivity request procedures with the MME server 130 for that geographical RAN region. The attach procedure can then authenticate the NB-IoT device 116A prior to establishment of its non-IP PDN data connection towards the SCEF.

Figure 3:
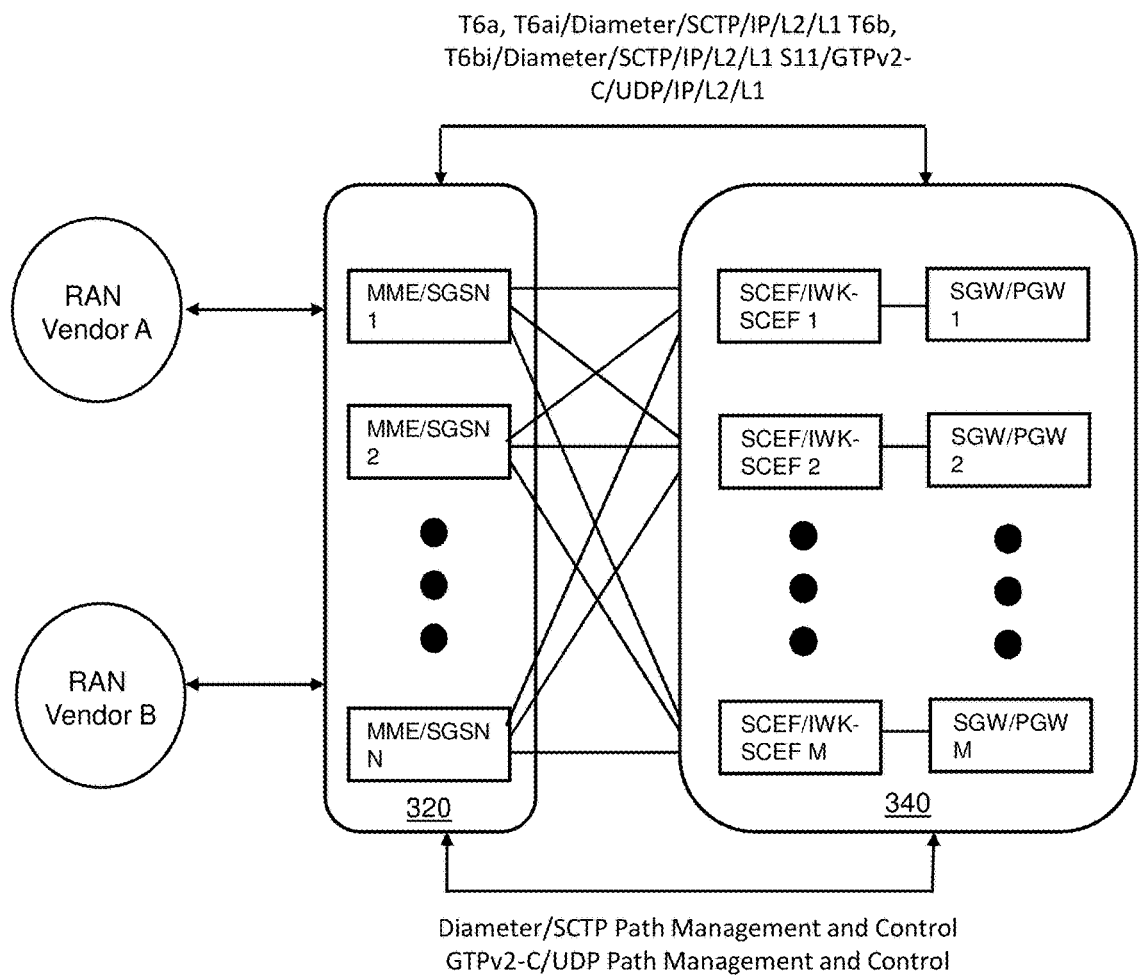
FIG. 3 depicts illustrative embodiments of a system for providing communication services for narrow band wireless devices in a mobile communication network using geo-redundant data centers with one-to-one paired modes.
Figure 4:
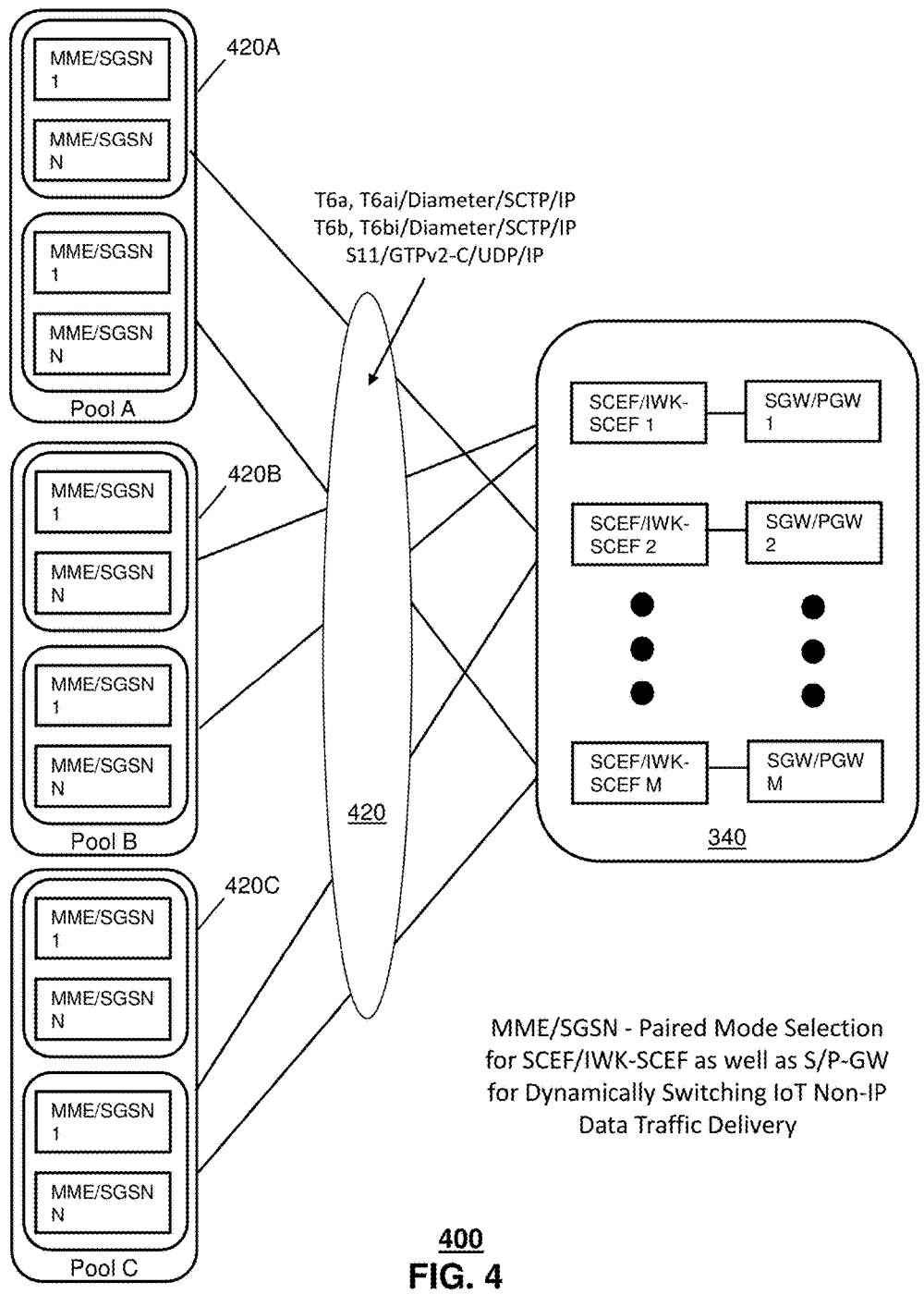
FIGS. 4-5 depict illustrative embodiments of systems for providing communication services for narrow band wireless devices in a mobile communication network using geo-redundant data centers with dynamically paired modes.
Figure 5:
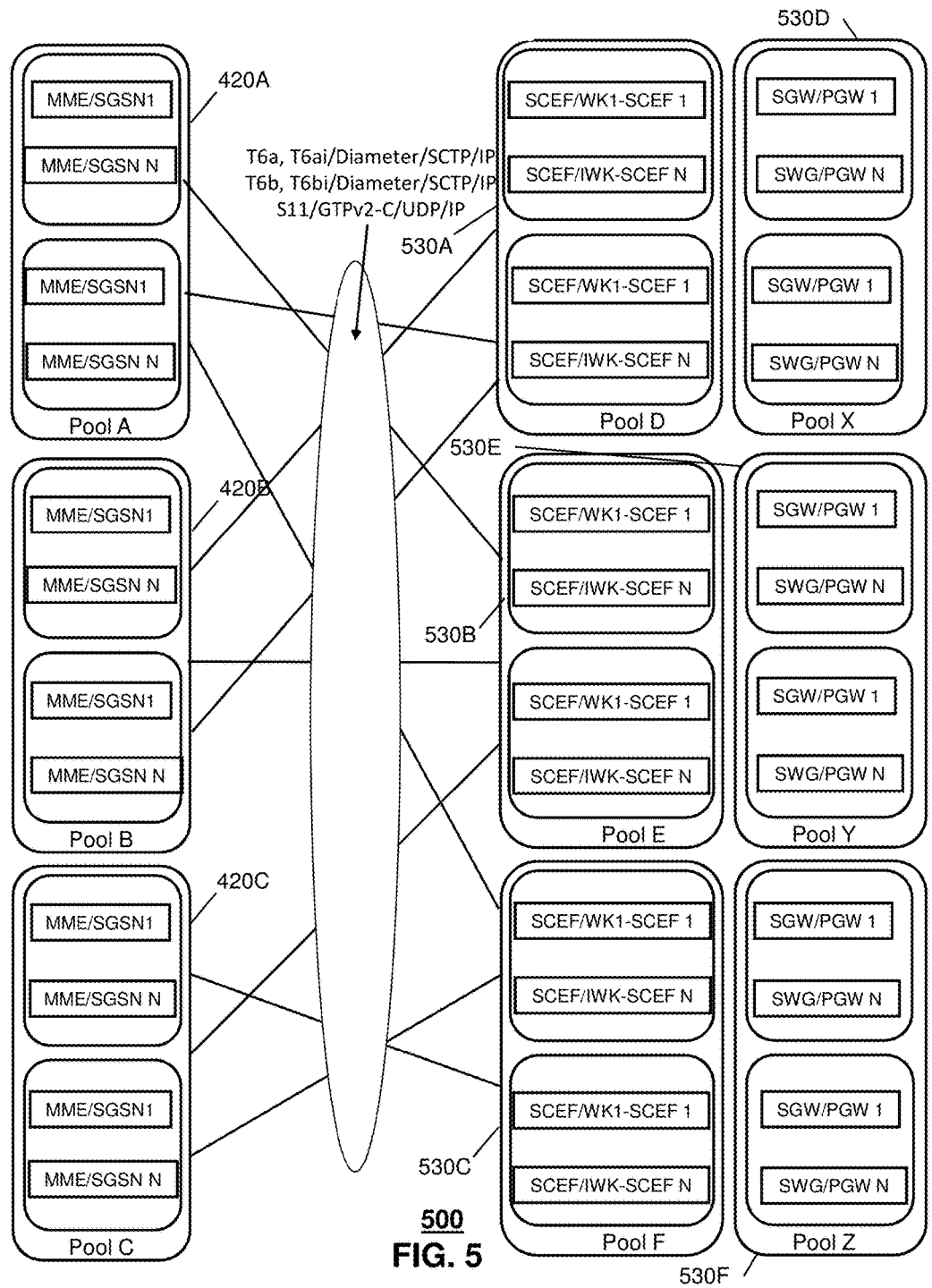

In one or more embodiments, prior to the PDN connection establishment for the NB-IoT device 116A, the MME server 130 should have connectivity with the SCEF 135 using the T6a signaling interface as defined in the 3GPP standards. The T6a interface can be Diameter based and can use SCTP as the transport layer protocol with a defined application identifier. The direct connectivity between MME and SCEF simplifies the overall LTE core network architecture design for NB-IoT device 116A services delivery. In such a paired mode design, the MME and SCEF networking entities can have proper nodal identification, addressing and configuration to be able to exchange bidirectional control plane message exchanges that can enable user payload data transfers. However, a multi-homed network, such as illustrated in FIGS. 3-5, can result in a much simpler T6a interface SCTP profile, Diameter protocol and application layer definitions, and IP addressing. In a simple IoT core network 100 of FIG. 1, can require direct MME-SCEF interconnections and the availability of active T6a links for establishing the PDN connection setup with the SCEF 135. The resulting PDN connection can also trigger the creation of an EPS bearer context in the MME server 130 and the SCEF 135. The bearer context information that is created in the MME server 130 and the SCEF 135 can be critical for facilitating ingress/egress data transfer between the SCEF 135 and related upstream/downstream peer networking entities to create a successful end-to-end data service flow for the NB IoT devices 116A.

At FIG. 3, in one or more embodiments, a system for providing communication services for narrow band wireless devices in a mobile communication network using geo-redundant data centers with one-to-one paired modes is illustrated. The system 300 for serving NB-IoT devices can include multi-vendor RANs, which can be served by a MME/SGSN regional pool network 320. The multi-vendor RANs, such as RAN vendor A and RAN vendor B, can be served by MME\SGSN pairs in the MME/SGSN regional pool network 320. Each MME\SGSN pair can be one-to-one paired with a single vendor, geo-redundant SCEF pair (or IWK-SCEF pair). In this configuration, each SCEF pair can be statically provisioned with nodal information for each MME pair, such as the MME node name, or CLLI, and node identifiers. Similarly, each MME pair can be provisioned with a SCEF nodal pair. A paired mode, MME-SCEF design, such as system 300 can be relatively less complex in terms of it IoT core network configuration than a distributed MME-SCEF design. However the details of each MME network element must be configured in the SCEF pair for each of the multiple RAN vendors. Pre-defined static mapping of MME-SCEF pairs requires a comprehensive listing of MME and SCEF control nodes that may be required for PDN connection establishment and a data transfer mechanisms in a distributed IoT core network 300. This complex static mapping can be avoided by segregating the MME and SCEF provisioning steps using a dynamic node selection methodology. Node selection in the MME can be simplified by dynamic node selection, and optimal and intelligent routing of IoT user data towards SCEF/IWK-SCEF control nodes can be achieved.

FIGS. 4-5 depict illustrative embodiments of systems for providing communication services for narrow band wireless devices in a mobile communication network using geo-redundant data centers with dynamically paired modes. In a large scale, distributed core network architecture network 400 and 500 deployment for serving millions of LTE users as well as millions of NB-IoT devices, the above-described direct (one-to-one) MME-SCEF connectivity approach cannot be applied. One-to-one pairing in a large-scale distributed core network architecture can be prohibitively complex and inefficient and can result in significant overhead costs for maintenance as well as growth.

In one or more embodiments, large scale, distributed core network architecture network 400 and 500 can deploy MME and SCEF nodes according to one or more architectures that move beyond one-to-one pairing and into dynamic pairing. At FIG. 4, SCEFs could be in geo-redundant data centers 340 along with SGW/PGWs that are part of a single pool. MMEs could be in geo-redundant data centers across multiple regional pools 420A-C. At FIG. 5, MMEs could, again, be in geo-redundant data centers across multiple regional pools 420A-C, while SCEF/SGW/PGWs are also in geo-redundant data centers across regional pools 530A-F.

For commercial NB IoT services offering in a large operator network, the 1:1 paired mode MME and SCEF (PNF or VNF) connectivity model lacks the flexibility, scalability and dynamic capacity requirements for servicing an evolving mobility networking and services infrastructure. In one or more embodiments, the dynamic connectivity model that is used in FIGS. 4 and 5 can rely on principles of Network Functions Virtualization (NFV) and Software Defined Networking (SDN) technologies and can use open standards protocols. The SCEF can be provisioned with information for all of the downstream MME network elements to ensure that the PDN connection procedures happen appropriately with the right nodes. The SCEF can also be provisioned with PGW nodes to enable dynamically switching of the data delivery path to the user plane on demand. The static provisioning method in the architecture of FIGS. 1 and 3 is not as amenable or flexible in accommodating large sets of MME/PGW/SGW nodes. In addition, the one-to-one architecture is not as suitable for premium NB-IoT services offered in targeted geographic coverage areas, data acquisition and reporting of dynamic device behaviors in such areas, and/or new service demands and application that are anticipated and/or required to provide the necessary quality of experience associated with a massive IoT devices. Customer dissatisfaction and churn can results in a ripple effects with revenue loss against multitude of mobile IoT services across several industry verticals. In one or more embodiments, the dynamic pairing in the networks of FIGS. 4-5 can provide dynamic, flexible and intelligent IoT core network solution without requiring the same level of upfront requirements planning, nodal software release development, and network level integration cycles that lead to delayed time to market.

Deploying a large number of MME and SCEF/GW nodes in a single pooled configuration, as in system 300 FIG. 3, can create significant complexity with respect to multiple proliferations of IP addresses, provisioning requirements for T6a interface connectivity, static mapping definitions for full mesh topology, links, and alarms maintenance. When SCEF/GW nodes are centralized in a single pool and the MME nodes are distributed across several regional pools, as in the system 400 FIG. 4, the complexities associated with the multiple proliferations only grows. The same increase in multiple proliferation and complexity is demonstrated when the MME and SCEF/GW nodes are completely distributed in several regional pools, as in the sytem 500 of FIG. 5. The addition of SGSN to MME to provide data paths for 3G devices 116B only exacerbates this problem with the corresponding T6b interface. Finally, the demand on equivalent T6ai and T6bi interfaces at other MME/SGSN nodes that are visited by roaming devices 116A only further aggravates the home network configuration complexity. By using a DNS-based process for dynamically selecting and revising pairings and combining this selection process with a dynamic routing agent (DRA) based routing mechanism, massive IoT connectivity evolution can be achieved.

In one or more embodiments, the MME 130 can query a DNS server for return of available SCEF/IWK-SCEF/GWs node names. The query can also return status information associated with the available SCEF/IWK-SCEF/GWs nodes. For example, the DNS can return information regarding link status, order and/or preference for use. The DNS can return information regarding traffic utilization and real time round trip time latency factors for the MME/SGSN that desires to establish one or more PDN connections with the SCEF/IWK-SCEF/GWs node for use by one or more NB-IoT devices 116A in a given serving area.

In one or more embodiments, the MME server 130 can utilize one of the status information metrics, or a combination of these metrics, to make an intelligent selection of the SCEF/IWK-SCEFs/GWs nodes for use in IoT data paths to the AS 170. The MME server 130 can maintain the DNS status information in a cache for a certain duration that could be updated periodically based on the interface link status. The MME server 130 can maintain the selections of SCEF/IWK-SCEFs/GWs nodes in a cache for that can be periodically updated. The dynamic DNS-based selection of SCEF/IWK-SCEFs/GWs nodes and pairs can be combined with the Diameter interfaces path management procedures to help the MME server 130 in in making an intelligent decision on the primary/secondary options for serving SCEF/IWK-SCEF/GW pairs prior to continuation with non-IP PDN connection establishment procedures. This approach avoids pre-provisioning of all SCEF/IWK-SCEF/GW node information in the MME server 130, which would result in greater simplification of core design that can further scale based on the network and service dynamics in a given location. In one or more embodiments, the SGSN 125 can implement a similar process for using DNS information in selecting SCEF/IWK-SCEF nodes 135 for use by 3G NB-IoT devices 116A.

In one or more embodiments, once selection of SCEF/IWK-SCEF and GW (S-GW and P-GW) nodes is completed by the MME server 130, the MME server 130 creates an internal mapping of these serving nodes for transfer of non-IP data between the Nb-IoT node 116A and the AS 170 via the selected SCEF/IWK-SCEF nodes. For example, upon establishing the non-IP PDN connection with the selected SCEF/IWK-SCEF node or nodes, the MME server 130 can receive data from an NB-IoT device 116A and forward this data to the AS 170 using the selected SCEF nodes 135. Similarly, the SGSN 125 can transfer non-IP data between a 3G NB-IoT device 116B and the AS 170 via an SCEF 135.

In one or more embodiments, the MME server 130 can analyze the amount of data that is transferring between a given device 116A and the AS 170 by the selected SCEF node or nodes 135, the aggregate data flowing through the selected SCEF node or nodes 135, and/or a predicted data flow for the selected SCEF node or nodes 135. The MME server 139 can compare this data flow information to one or more threshold values. The MME server 130 can determine the one or more threshold values based on evaluation of the key performance attributes of the selected SCEF node. In one or more embodiment, if the measured or predicted dataflow it exceeds the one or more threshold values, then the MME server 130 can trigger a switch from the SCEF data path to a C-SGN 165 data path. The C-SGN 165 PDN data path can be pre-initiated by the MME server 130, at the time of attachment of the NB-IoT device 116A or can be initiated by the MME server 130 only when it is needed. With this PDN selection or establishment, the user data could flow directly from the NB-IoT device 116A, through the RAN 122 and 110, the SGW/PGW, and to the AS 170. A data congestion issue with the SCEF 35 can thereby be alleviated without increasing the resource requirements of the network 100 or the MME server 130.

In one or more embodiments, the availability of parallel data connection paths provides the MME server 130 with an ability to intelligently and dynamically switch the context for data transfer via real time analysis of its resources. As a large number of IoT devices 116A are attached to the MME server 130, the MME server 130 can intervene into temporary bottlenecks caused by heavy data usage (consumption/reporting) based on appropriate external triggers. The MME server 130 can use this switching capability to provide a means for auto balancing PDN connections between the SCEF and the SGW/PGW. If SGW/PGW loading is too high, then the MME server 130 can offload some of the non-IP data flow onto the SCEF path. This capability can facilitate smooth data transfer and improve end user and service provider satisfaction. The combinatorial of DNS-based peer node selection with dynamic switching of PDN connections allows the network provider to create a fully flexible and dynamically reconfigurable IoT core network architecture that can steer traffic based on size, duration, and quality of service, while adapting to the dynamics of mobility network conditions.

Figure 6:
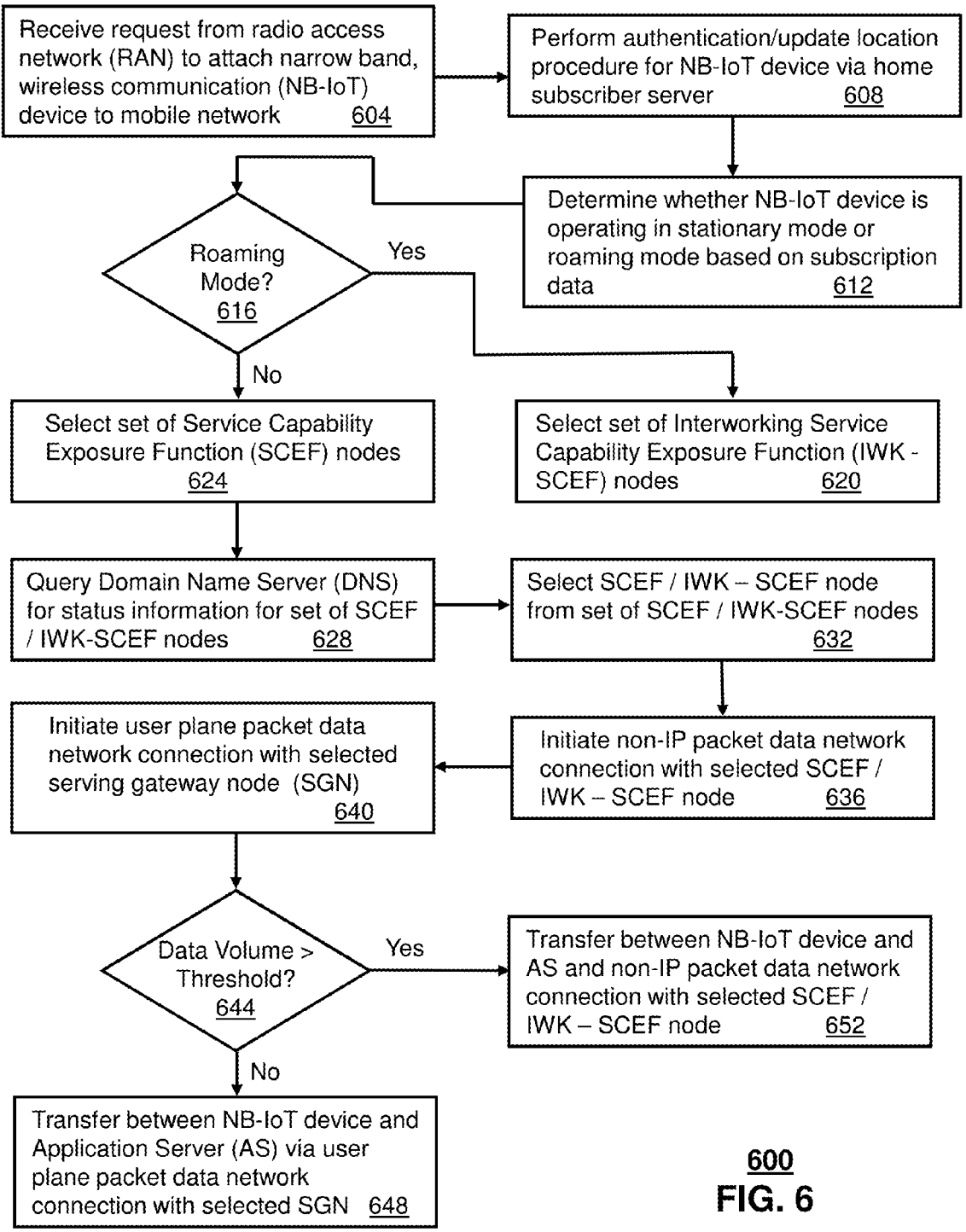
FIG. 6 depicts illustrative embodiments of a method used in portions of the systems described in FIGS. 1 and 3-5.

FIG. 6 depicts an illustrative embodiment of a method 600 used in portions of the described in FIGS. 1 and 3-5 for dynamically selecting and routing IoT device data in a mobile communication network. In step 604, a MME server can receive a request to connect a NB-IoT device to a mobile communication network. In one embodiment, the request can be in response to a power up of the NB-IoT device. In one embodiment, the request can be a result of an attach procedure at the NB-IoT device. In one embodiment, the request can be a result of a Tracking Area Update (TAU) procedure at the NB-IoT. In another embodiment, the NB-IoT device is a dual mode device, where the request is part of a regular (non-IoT) attach or TAU procedure. In one or more embodiments, the NB-IoT device can be mobile device or a stationary device.

In step 608, the MME server can perform an authentication and/or an update location procedure for the NB-IoT device by sending a query to a HSS. In one embodiment, the MME can receive an attach request and/or TAU request. A conventional HSS of the mobile communication network can be used. Alternatively, a dedicated HSS can be used for IoT services. In step 612, the MME server can determine whether the NB-IoT device is operating in a stationary mode or in a roaming mode based on subscription data. As part of the authentication process, the HSS can return subscription data to the MME server. The MME server can analyze the subscription data that is associated with the NB-IoT device to determine whether NB-IoT device is stationary to its location—at least with respect to its local RAN resources—or is roaming between different RAN resource locations.

In step 616, if the MME server determines that the NB-IoT device is a roaming device, then it can select a set of IWK-SCEF nodes, in step 620, for potential use in servicing non-IP data transfers for the NB-IoT device. If the MME server determines that the NB-IoT device is a stationary device, then it can select a set of SCEF nodes, in step 624, for potential use in servicing non-IP data transfers for the NB-IoT device. In one or more embodiments, the MME server can decide to select a set of SCEF/IWK-SCEF nodes to establish a non-IP PDN data connection towards the SCEF or towards the IWK-SCEF based on an analysis of the subscription data received from HSS. The MME server can also base the selection of its own internal provisioning or can combine the subscription data with internally provisioned information. In one or more embodiments, the MME server can performs intelligent correlated mapping to perform SCEF selection.

In step 628, the MME server can query a DNS to obtain status information for the set of potential SCEF/IWK-SCEF nodes. In step 632, the MME Server 130 can analyze the returned DNS status information to select one or more SCEF/IWK SCEF nodes based on the status information. In one or more embodiments, the MME server can employ a DNS-based NAPTR query using SCEF FQDN. The MME server can receiver DNS responses along with the NAPTR responses. The DNS response can include status information regarding the SCEF/IWK SCEF nodes. The status information can include the list of SCEF/IWK-SCEF Nodes, T6a/T6ai interface IP addresses, active link statuses, Node Utilization Factors, and/or Round Trip Latency for each SCEF/IWK SCEF node to the serving MME. In one or more embodiments, the MME server can analyzes DNS responses and perform intelligent selection of an SCEF/IWK-SCEF based on the received system level attributes. The MME server can select the SCEF/IWK-SCEF based on relative availability, low utilization, network availability, cost, speed, and so forth. The MME server can correlate the SCEF/IWK-SCEF that it selects, based on analyzing the DNS information, with the SGW/PGW that it selects to create virtual pairs that can be tracked in a mapping table of such resources.

In step 636, the MME server can initiate a non-IP PDN connection with the SCEF/IWK SCEF that it has selected for PDN communications. In one embodiment, the MME can create a non-IP PDN connection with the selected SCEF/IWK-SCEF nodes based on device IMSI evaluation. In one embodiment, the necessary routing for connecting MME server to the SCEF/IWK SCEF to create the PDN connectivity can be performed using a Diameter Routing Agent (DRA), a Diameter Edge Agent (DEA), and/or a direct connection, depending upon the connectivity model that is implemented in the network. In step 640, the MME can initiate a user plane PDN connection with a selected serving gateway node (SGN). In one or more embodiments, the MME server can select the SGW/PGW using a TAC and/or an APN DNS query. In one or more embodiments, the MME server can recieve a response back from the selected SCEF/IWK-SCEF node to complete the non-IP PDN connection to the serving MME. The response can be routed through the same DRA/DEA pairs. The MME server can map data to either (and re-map to either) the SCEF/IWK-SCEF nodes depending on whether the NB-IoT device is at the Home PLMN or the Visited PLMN. The MME server can map the data to the SGW/PGW pair in case of delivery of non-IP data over the user plane. Once the non-IP PDN connections have been successfully established, data can be transferred between the BN-IoT and an Application Server via the selected SCEF/IWK-SCEF node. In step 644, the MME server can determine if the data volume is greater than a threshold. The MME server can base the data volume determination on the data length and duration of a past transfer, a current transfer, and/or a future planned transfer. The MME server can receive one or more thresholds and/or can derive the thresholds based on the status information that was obtained and saved from the DNS analysis of the SCEF/IWK SCEF. In step 648, if the data volume is excessive, then the MME server can switch to delivery of the data using the non-IP PDN connection via the user plane using (PGW/SGW). The MME server can switch between the two non-IP PDN connects, as needed, to meet performance requirements.

Figure 7:
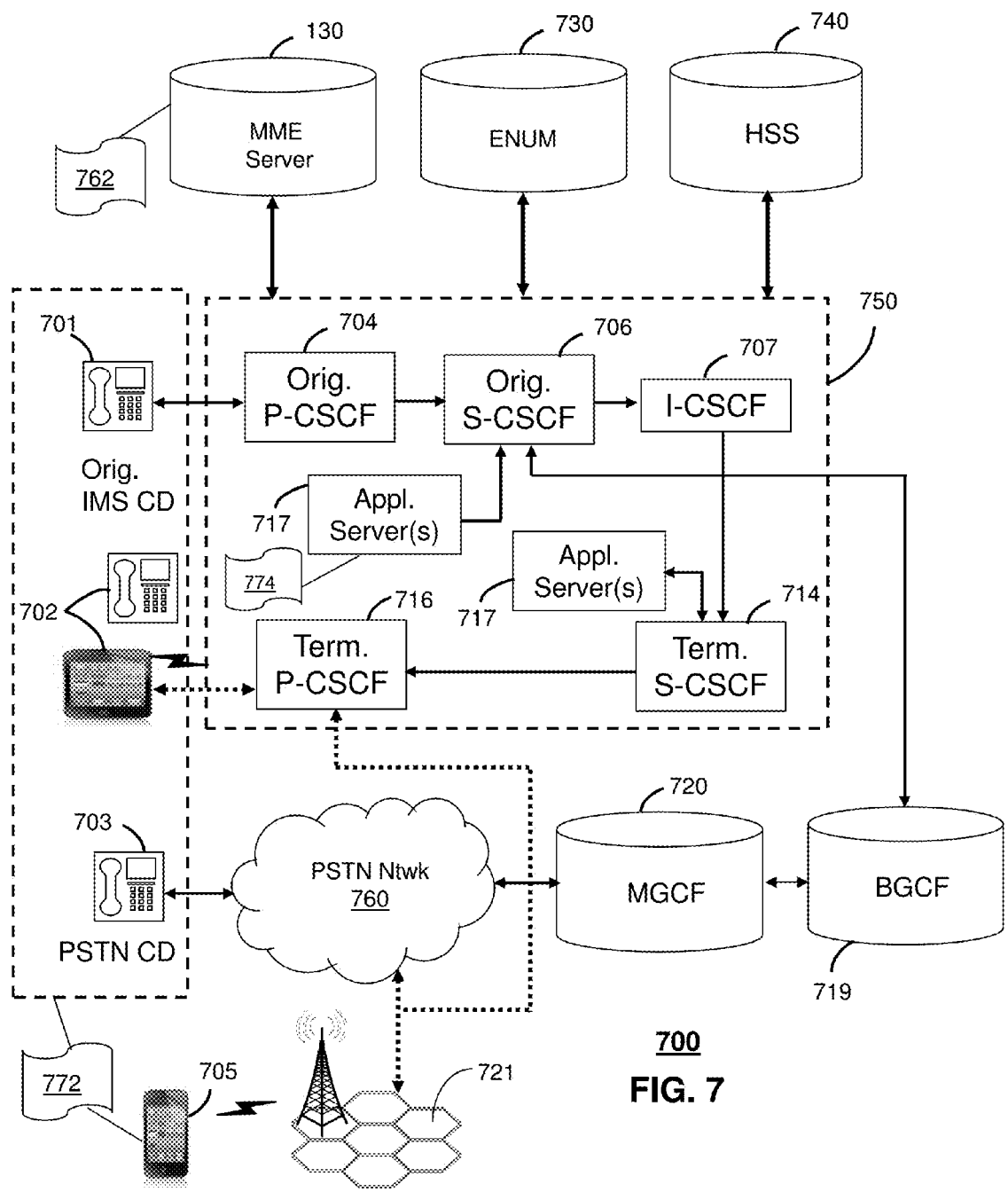
FIG. 7 depicts illustrative embodiments of a communication system that provides communication and media services for communication devices according to embodiments illustrated in FIGS. 1 and 3-5.

FIG. 7 depicts an illustrative embodiment of a communication system 700 employing an IP Multimedia Subsystem (IMS) network architecture to facilitate the combined services of circuit-switched and packet-switched systems. Communication system 700 can be overlaid or operably coupled with systems 100 and 300-500 of FIGS. 1, 3, 4, and 5, as another representative embodiment of communication system 700 for dynamically connecting a Narrow Band Internet of Things (NB-IoT) device to one or more data paths. A MME server can perform a DNS query on a set of SCEF nodes and select a SCEF node based on the returned results. The MME server can initiate non-IP PDN communications with the SCEF and with a CSGN user plane for transferring data between the NB-IoT device and an external Application Server. The MME server can switch between these data paths according to data loading.

Communication system 700 can comprise a Home Subscriber Server (HSS) 740, a tElephone NUmber Mapping (ENUM) server 730, and other network elements of an IMS network 750. The IMS network 750 can establish communications between IMS-compliant communication devices (CDs) 701, 702, Public Switched Telephone Network (PSTN) CDs 703, 705, and combinations thereof by way of a Media Gateway Control Function (MGCF) 720 coupled to a PSTN network 760. The MGCF 720 need not be used when a communication session involves IMS CD to IMS CD communications. A communication session involving at least one PSTN CD may utilize the MGCF 720.

IMS CDs 701, 702 can register with the IMS network 750 by contacting a Proxy Call Session Control Function (P-CSCF) which communicates with an interrogating CSCF (I-CSCF), which in turn, communicates with a Serving CSCF (S-CSCF) to register the CDs with the HSS 740. To initiate a communication session between CDs, an originating IMS CD 701 can submit a Session Initiation Protocol (SIP INVITE) message to an originating P-CSCF 704 which communicates with a corresponding originating S-CSCF 706. The originating S-CSCF 706 can submit the SIP INVITE message to one or more application servers (ASs) 717 that can provide a variety of services to IMS subscribers.

For example, the application servers 717 can be used to perform originating call feature treatment functions on the calling party number received by the originating S-CSCF 706 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 706 can submit queries to the ENUM system 730 to translate an E.164 telephone number in the SIP INVITE message to a SIP Uniform Resource Identifier (URI) if the terminating communication device is IMS-compliant. The SIP URI can be used by an Interrogating CSCF (I-CSCF) 707 to submit a query to the HSS 740 to identify a terminating S-CSCF 714 associated with a terminating IMS CD such as reference 702. Once identified, the I-CSCF 707 can submit the SIP INVITE message to the terminating S-CSCF 714. The terminating S-CSCF 714 can then identify a terminating P-CSCF 716 associated with the terminating CD 702. The P-CSCF 716 may then signal the CD 702 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 7 may be interchangeable. It is further noted that communication system 700 can be adapted to support video conferencing. In addition, communication system 700 can be adapted to provide the IMS CDs 701, 702.

If the terminating communication device is instead a PSTN CD such as CD 703 or CD 705 (in instances where the cellular phone only supports circuit-switched voice communications), the ENUM system 730 can respond with an unsuccessful address resolution which can cause the originating S-CSCF 706 to forward the call to the MGCF 720 via a Breakout Gateway Control Function (BGCF) 719. The MGCF 720 can then initiate the call to the terminating PSTN CD over the PSTN network 760 to enable the calling and called parties to engage in voice and/or data communications.

It is further appreciated that the CDs of FIG. 7 can operate as wireline or wireless devices. For example, the CDs of FIG. 7 can be communicatively coupled to a cellular base station 721, a femtocell, a WiFi router, a Digital Enhanced Cordless Telecommunications (DECT) base unit, or another suitable wireless access unit to establish communications with the IMS network 750 of FIG. 7. The cellular access base station 721 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 7.

Cellular phones supporting LTE can support packet-switched voice and packet-switched data communications and thus may operate as IMS-compliant mobile devices. In this embodiment, the cellular base station 721 may communicate directly with the IMS network 750 as shown by the arrow connecting the cellular base station 721 and the P-CSCF 716.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

A MME server 130 of FIG. 1 can be operably coupled to communication system 700 for purposes similar to those described above. MME server 130 can perform function 762 and thereby provide dynamic data path services to the CDs 701, 702, 703 and 705 of FIG. 7 similar to the functions described for MME server 130 of FIG. 1 in accordance with method 600 of FIG. 6. CDs 701, 702, 703 and 705, which can be adapted with software to perform function 772 to utilize the services of the MME server 130. MME server 130 can be an integral part of the application server(s) 717 performing function 774, as adapted to the operations of the IMS network 750.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3$^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 8:
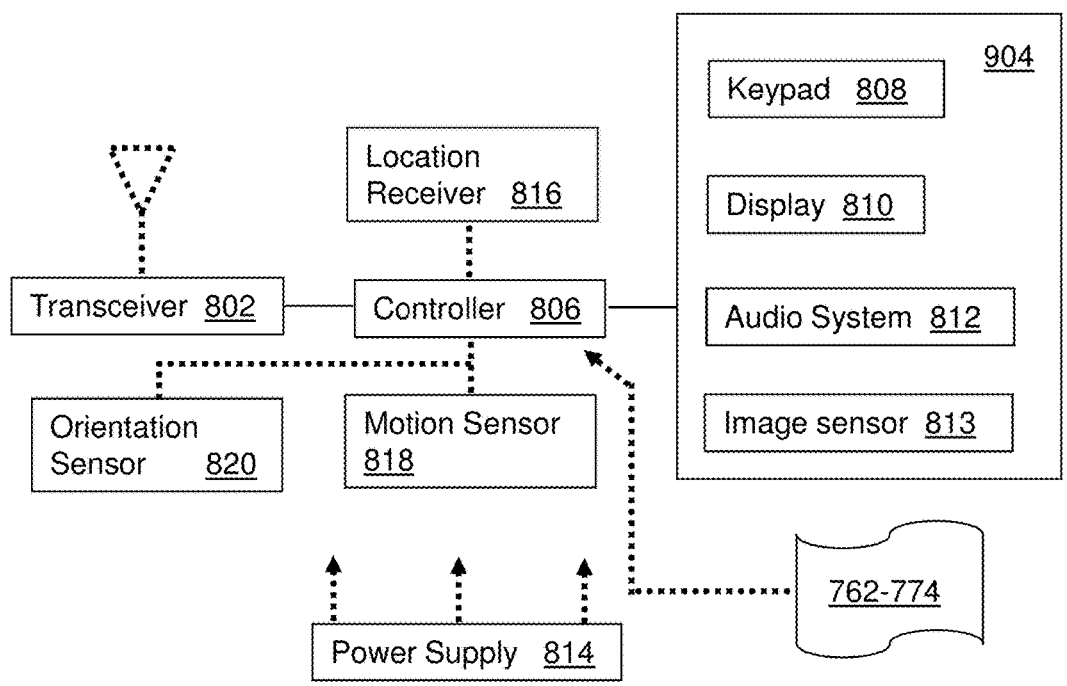
FIG. 8 depicts an illustrative embodiment of a communication device.

FIG. 8 depicts an illustrative embodiment of a communication device 800. Communication device 800 can serve in whole or in part as an illustrative embodiment of the devices depicted in FIGS. 1, 3, 4, 5, and 7 and can be configured to perform portions of method 600 of FIG. 6.

Communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of devices of FIGS. 1, 3, 4, and 5, as well as the IMS CDs 701-702 and PSTN CDs 703-705 of FIG. 7. It will be appreciated that the communication device 800 can also represent other devices that can operate in systems 100, 300, 400, and 500, of FIGS. 1, 3, 4, and 5, communication system 700 of FIG. 7, such as a narrow band IoT device 116A-B, and MME server 130. In addition, the controller 806 can be adapted in various embodiments to perform the functions 762-774, respectively.

Upon reviewing the aforementioned embodiments, it would be evident to an artisan with ordinary skill in the art that said embodiments can be modified, reduced, or enhanced without departing from the scope of the claims described below.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
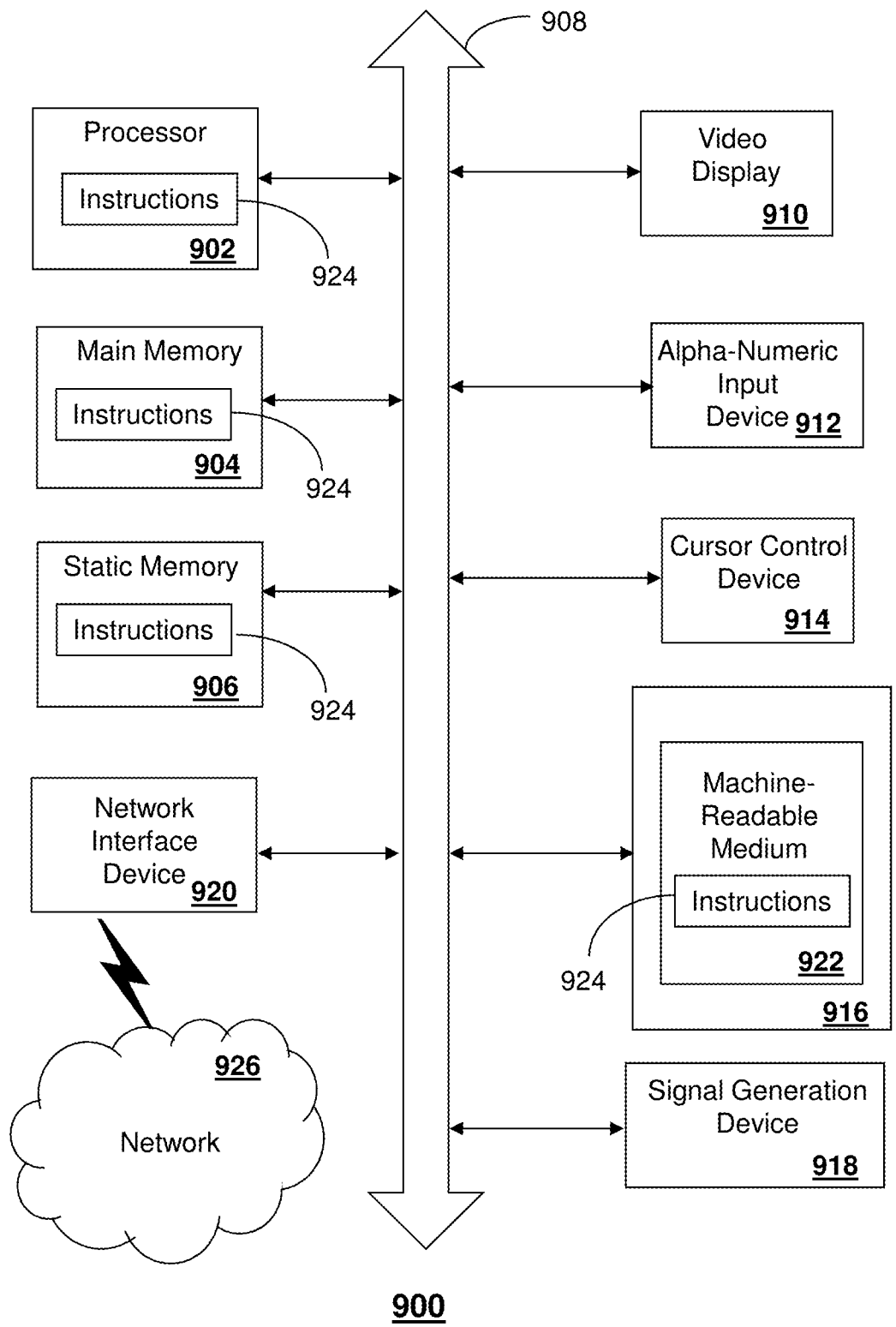
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as the MME server 130, the NB-IoT devices 116A-B, the SCEF nodes 135, SGSN 125, and the C-SGN 165, and other devices of FIGS. 1, 3-5, 7, and 8. In some embodiments, the machine may be connected (e.g., using a network 926) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein.

Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 900. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobility management entity server, comprising:
    a processing system including a processor; and
    a memory that stores executable instructions that, when executed by the processing system, facilitate performance of operations, comprising:
    receiving, from a radio access network, a request to connect a wireless communication device to a mobile communication network;
    selecting a set of service capability exposure function nodes of the mobile communication network;
    receiving, from a domain name server, status information associated with the set of service capability exposure function nodes that are selected;
    selecting a first service capability exposure function node from the set of service capability exposure function nodes according to the status information for the set of service capability exposure function nodes;
    initiating a first non-IP packet data network connection with the first service capability exposure function node;
    initiating a user plane packet data network connection with a serving gateway node of the mobile communication network, wherein the serving gateway node includes a serving gateway and a packet data network gateway;
    determining a data volume associated with a request for a transfer;
    comparing the data volume associated with the request for the transfer to a data threshold to determine that a data volume is high; and
    selecting the first non-IP packet data network connection or the user plane packet data network connection as a delivery path for data to transfer between the wireless communication device and an external application server according to a determination that the data volume associated with the request for the transfer is high.

2. The mobility management server of claim 1, wherein the operations further comprise determining, from subscription data associated with the wireless communication device, whether the wireless communication device is operating in a stationary mode or a roaming mode with respect to a serving area of the radio access network, wherein the set of service capability exposure function nodes of the mobile communication network selected to be local to the serving area if the wireless communication device is determined to be operating in the stationary mode and are selected to be remote to the serving area if the wireless communication device is determined to be operating in the roaming mode.

3. The mobility management server of claim 2, wherein the set of service capability exposure function nodes of the mobile communication network is part of a geo-redundant plurality of service capability exposure function nodes.

4. The mobility management server of claim 3, wherein a Diameter routing agent pairs the first service capability exposure function node to the serving gateway node.

5. The mobility management server of claim 1, wherein the data threshold is determined according to performance attributes of the non-IP packet data network connection.

6. The mobility management server of claim 1, wherein the status information associated with the set of service capability exposure function nodes includes loading characteristics, performance characteristics, or a combination thereof for the set of service capability exposure function nodes.

7. The mobility management server of claim 1, wherein the operations further comprise:
    querying, according to the request to connect, a home subscriber server of the mobile communication network to authenticate the wireless communication device to the mobile communication network; and
    receiving, from the home subscriber server, subscription data associated with the wireless communication device responsive to authentication of the wireless communication device.

8. The mobility management server of claim 7, wherein the operations further comprise determining, from the subscription data associated with the wireless communication device, whether the wireless communication device is a narrow band device.

9. The mobility management server of claim 1, wherein the request to connect is associated with a tracking area update for the wireless communication device.

10. The mobility management server of claim 1, wherein the request to connect is associated with a transition of the wireless communication device from an idle mode.

11. The mobility management server of claim 1, wherein the operations further comprise querying the domain name server for the status information associated with the set of service capability exposure function nodes.

12. The mobility management server of claim 1, wherein the data volume associated with the request for the transfer is based on data length and duration of a past transfer, a current transfer, a future planned transfer, or any combination thereof.

13. A non-transitory machine-readable storage medium, comprising executable instructions that, when executed by a processing system including a processor, facilitate performance of operations at a call session control function server, comprising:
receiving, from a radio access network, a request to connect a wireless communication device to a mobile communication network;
authenticating the wireless communication device from subscription data associated with the wireless communication device;
querying a domain name server for status information associated with a set of service capability exposure function nodes associated with providing data capability for the wireless communication device;
receiving, from a domain name server, status information associated with a set of service capability exposure function nodes that are selected;
selecting a first service capability exposure function node from the set of service capability exposure function nodes according to the status information for the set of service capability exposure function nodes;
initiating a first non-IP packet data network connection with the first service capability exposure function node;
initiating a user plane packet data network connection with a serving gateway node of the mobile communication network, wherein the serving gateway node includes a serving gateway and a packet data network gateway;
determining a data volume associated with a request for a transfer; and
comparing the data volume associated with the request for the transfer to a data threshold to determine that a data volume is high; and
selecting the first non-IP packet data network connection or the user plane packet data network connection as a delivery path for data to transfer between the wireless communication device and an external application server according to a determination that the data volume associated with the request for the transfer is high.

14. The non-transitory machine-readable storage medium of claim 13, wherein the operations further comprise determining, from the subscription data, whether the wireless communication device is operating in a stationary mode or a roaming mode with respect to a serving area of the radio access network.

15. The non-transitory machine-readable storage medium of claim 14, wherein the operations further comprise selecting the set of service capability exposure function nodes of the mobile communication network that are local to the serving area if the wireless communication device is determined to be operating in the stationary mode and that are remote to the serving area if the wireless communication device is determined to be operating in the roaming mode.

16. The non-transitory machine-readable storage medium of claim 13, wherein the set of service capability exposure function nodes of the mobile communication network is part of a geo-redundant plurality of service capability exposure function nodes.

17. The non-transitory machine-readable storage medium of claim 16, wherein a Diameter routing agent pairs the first service capability exposure function node to the serving gateway node.

18. The non-transitory machine-readable storage medium of claim 13, wherein the status information associated with the set of service capability exposure function nodes includes loading characteristics, performance characteristics, or a combination thereof for the set of service capability exposure function nodes.

19. A method, comprising:
querying, by a processing system including a processor, a domain name server for status information associated with a set of service capability exposure function nodes associated with providing data capability for a wireless communication device in a mobile communication network;
receiving, from the domain name server, by the processing system, status information associated with a set of service capability exposure function nodes that are selected;
selecting, by the processing system, a first service capability exposure function node from the set of service capability exposure function nodes according to the status information for the set of service capability exposure function nodes;
initiating, by the processing system, a first non-IP packet data network connection with the first service capability exposure function node;
initiating, by the processing system, a user plane packet data network connection with a serving gateway node of the mobile communication network, wherein the serving gateway node includes a serving gateway and a packet data network gateway;
determining, by the processing system, a data volume associated with a request for a transfer; and
comparing, by the processing system, the data volume associated with the request for the transfer to a data threshold to determine that a data volume is high; and
selecting, by the processing system, the first non-IP packet data network connection or the user plane packet data network connection as a delivery path for data to transfer between the wireless communication device and an external application server according to a determination that the data volume associated with the request for the transfer is high.

20. The method of claim 19, further comprising:
determining, by the processing system and from subscription data associated with the wireless communication device, whether the wireless communication device is operating in a stationary mode or a roaming mode with respect to a serving area of a radio access network; and
selecting, by the processing system, the set of service capability exposure function nodes of the mobile communication network that are local to the serving area if the wireless communication device is determined to be operating in the stationary mode and that are remote to the serving area if the wireless communication device is determined to be operating in the roaming mode.

* * * * *